United States Patent
Lu et al.

(10) Patent No.: US 10,111,195 B2
(45) Date of Patent: Oct. 23, 2018

(54) METHODS IMPLEMENTED IN ACCESS NODES FOR MAINTAINING SYNCHRONIZATION IN RADIO ACCESS NETWORK AND ASSOCIATED ACCESS NODES

(71) Applicant: Telefonaktiebolaget LM Ericsson (publ), Stockholm (SE)

(72) Inventors: Qianxi Lu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/323,399

(22) PCT Filed: Aug. 7, 2014

(86) PCT No.: PCT/CN2014/083843
§ 371 (c)(1),
(2) Date: Dec. 30, 2016

(87) PCT Pub. No.: WO2016/019536
PCT Pub. Date: Feb. 11, 2016

(65) Prior Publication Data
US 2017/0156122 A1 Jun. 1, 2017

(51) Int. Cl.
*H04J 3/06* (2006.01)
*H04W 56/00* (2009.01)
(Continued)

(52) U.S. Cl.
CPC ..... *H04W 56/0015* (2013.01); *H04L 43/0817* (2013.01); *H04W 4/06* (2013.01); *H04W 56/002* (2013.01); *H04W 74/085* (2013.01)

(58) Field of Classification Search
CPC . H04W 56/0015; H04W 4/06; H04W 74/085; H04L 43/0817
(Continued)

(56) References Cited

U.S. PATENT DOCUMENTS 5,650,830 A * 7/1997 Lee .................... H03J 7/04
348/731
2002/0114303 A1 8/2002 Crosbie et al.
(Continued)

FOREIGN PATENT DOCUMENTS

CN 101983532 A 3/2011
CN 102132621 A 7/2011
(Continued)

OTHER PUBLICATIONS

Examination report from foreign counterpart Australian Patent Application No. 2014403118, dated Nov. 28, 2017, 3 pages.
(Continued)

*Primary Examiner* — Chi H Pham
*Assistant Examiner* — Fahmida S Chowdhury
(74) *Attorney, Agent, or Firm* — NDWE LLP

(57) ABSTRACT

A method implemented in Access Nodes (ANs) for maintaining synchronization in a radio access network employing a hierarchical synchronization mechanism. One of the methods is implemented in an Access Node (AN) at synchronization level 1 and comprises detecting that an AN at synchronization level 0 is down and initiating a random back-off procedure. The method further comprises determining whether a first synchronization signal generated at another AN at synchronization level 1 is received during the random back-off procedure. If it is determined that no first synchronization signal is received during the random back-off procedure, a second synchronization signal providing a synchronization reference is generated and broadcast upon
(Continued)

Synchronization level 0

Synchronization level 1 completion of the random back-off procedure. The method also provides ANs for maintaining synchronization in a radio access network employing a hierarchical synchronization mechanism.

20 Claims, 7 Drawing Sheets

(51) Int. Cl.
*H04L 12/26* (2006.01)
*H04W 4/06* (2009.01)
*H04W 74/08* (2009.01)

(58) Field of Classification Search
USPC .......................................................... 370/350
See application file for complete search history.

(56) References Cited

U.S. PATENT DOCUMENTS

| | | | |
|---|---|---|---|
| 2007/0177574 | A1 | 8/2007 | Park et al. |
| 2009/0290511 | A1 | 11/2009 | Budampati et al. |
| 2010/0157975 | A1* | 6/2010 | In .......................... H04J 3/0682 370/350 |
| 2010/0303092 | A1* | 12/2010 | Chinnaswamy .... H04L 41/0806 370/465 |
| 2012/0275429 | A1* | 11/2012 | Chin ................... H04W 74/085 370/331 |
| 2013/0185373 | A1 | 7/2013 | Vandwalle et al. |

FOREIGN PATENT DOCUMENTS

| | | | |
|---|---|---|---|
| CN | 102665268 | A | 9/2012 |
| EP | 2131511 | A2 | 12/2009 |
| JP | H0629914 | A | 2/1994 |
| JP | H08307319 | A | 11/1996 |
| JP | 2001044915 | A | 2/2001 |
| JP | 2002164837 | A | 6/2002 |
| JP | 2005065210 | A | 3/2005 |
| JP | 2010500794 | A | 1/2010 |
| JP | 2010068127 | A | 3/2010 |
| JP | 2015503885 | A | 2/2015 |
| WO | 2006102558 | A2 | 9/2006 |
| WO | 2013106711 | A1 | 7/2013 |

OTHER PUBLICATIONS

International Preliminary Report on Patentability for Application No. PCT/CN2014/083843, dated Feb. 16, 2017, 6 pages.
Extended European Search Report for Application No. 14899484.1, dated Jun. 20, 2017, 6 pages.
International Search Report and Written Opinion, Application PCT/CN2014/083843, dated May 8, 2015, 8 pages.
3GPP TR 36.922, "3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 11)," Sep. 2012, 74 pages, V11.0.0, 3GPP Organizational Partners.
3GPP TR 36.843, "3rd Generation Partnership Project; Technical Specification Group Radio Access Network; Study on LTE Device to Device Proximity Services; Radio Aspects (Release 12)," Mar. 2014, 50 pages, V12.0.1, 3GPP Organizational Partners.
Osvaldo Simeone et al., "Distributed Synchronization in Wireless Networks, Global synchronization via local connections," Sep. 2008, pp. 81-97, IEEE Signal Processing Magazine.
Intention to grant a patent for Application No. 14899484.1, dated Mar. 26, 2018, 80 pages.
Communication pursuant to Rules 70(2) and 70a(2) EPC for Application No. 14899484.1, dated Jul. 7, 2017, 1 page.
First Office Action and Search Report from foreign counterpart Chinese Patent Application No. 201480080986.6, dated Aug. 1, 2018, 6 pages.
Office Action from foreign counterpart Mexican Patent Application No. MX/a/2017/000337, dated May 30, 2018, 3 pages.
Notice of Allowance from foreign counterpart Japanese Patent Application No. 2017-500838, dated Mar. 19, 2018, 3 pages.

* cited by examiner

Synchronization level 0

Synchronization level 1

Synchronization level 0

Synchronization level 1

Synchronization level 2

METHODS IMPLEMENTED IN ACCESS NODES FOR MAINTAINING SYNCHRONIZATION IN RADIO ACCESS NETWORK AND ASSOCIATED ACCESS NODES

CROSS-REFERENCE TO RELATED APPLICATIONS

This application is a National stage of International Application No. PCT/CN2014/083843, filed Aug. 7, 2014, which is hereby incorporated by reference.

TECHNICAL FIELD

The present disclosure generally relates to the technical field of wireless communications, and particularly, to methods implemented in access nodes (ANs) as well as the ANs for maintaining synchronization in a radio access network employing a hierarchical synchronization mechanism.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

The ultimate goal of mobile broadband should be ubiquitous and sustainable provision of non-limiting data rates to everyone and everything at every time. To achieve this goal, Ultra-Dense Network (UDN) has been proposed as an important next step following the successful introduction of Long Term Evolution-Advanced (LTE-A) for wide-area and local-area access.

Through sufficient provision of ANs and operation at very wide bandwidths in the millimeter-wave bands, UDN creates ubiquitous access opportunities which—even under realistic assumption on user density and traffic—provide users with the desired data rates.

In a UDN, sufficient provision is achieved by an extremely dense grid of ANs. To be specific, inter-AN distances may be in the order of tens of meters or below. In indoor deployments, one or even multiple ANs may be arranged in each room.

As a prerequisite for communications via a UDN, backhaul link synchronization between ANs in the UDN shall be achieved not only in time domain but also in frequency domain. The time domain synchronization prevents Uplink/Downlink collision (assuming TDD duplex is applied for the UDN) and enables intelligent inter-cell interference coordination. The frequency domain synchronization enables low-complexity frequency error estimation and accordingly reduces handover latency.

Due to the fact that there is typically no wired connection between ANs in a UDN, wired backhaul based synchronization techniques (including, for example, packet based synchronization scheme, Global Navigation Satellite System synchronization scheme, etc.) commonly used in traditional cellular networks are no longer applicable to UDNs. Instead, wireless backhaul based synchronization techniques have been proposed particularly for UDNs.

Generally, the existing wireless backhaul based synchronization techniques can be classified into two types: hierarchical synchronization (see Reference 1) and distributed synchronization (see Reference 2).

According to an example of hierarchical synchronization as illustrated in FIG. 1, one of multiple ANs in a UDN is selected as a synchronization root and assigned a synchronization level 0. Two other ANs adjacent to the level-0 AN are each assigned a synchronization level 1 and synchronized to the level-0 AN directly by referring to a synchronization reference conveyed by a synchronization signal broadcast by the level-0 AN. Likewise, ANs adjacent to the level-1 ANs are each assigned a synchronization level 2 and synchronized to the level-1 ANs directly by referring to the synchronization reference conveyed by synchronization signals broadcast by the level-1 ANs, and so on.

In this manner, a synchronization tree is formed from the level-0 AN (i.e., the root AN) to level-n (n>0) ANs (i.e., leaf ANs). The level-1 ANs can be synchronized to the level-0 AN directly by referring to the synchronization reference originating from the level-0 AN directly, while higher-level ANs can be synchronized to the level-0 AN indirectly by referring to the synchronization reference originating from the level-0 AN indirectly.

Typically, an aggregation node (AGN) which has access to an accurate synchronization source (e.g., a Global Position System (GPS) source) may be selected as the root AN. Practical application of the hierarchical synchronization scheme can be found in device-to-device communications in out-of-coverage scenario (see Reference 3).

According to an example of distributed synchronization as illustrated in FIG. 2, each of ANs on the one hand broadcasts a synchronization signal and on the other hand receives synchronization signals broadcast by its neighboring ANs. Based on its received synchronization signals, the AN can update its own synchronization, for example, by performing an arithmetic averaging operation on synchronization references carried by the received synchronization signals. During the initial setup stage of distributed synchronization, iterations are thus required to reach a convergence.

Due to the important role of the root AN in a UDN employing the hierarchical synchronization scheme, synchronization can no longer be maintained in the UDN if the root AN (i.e., the level-0 AN) is down. At the first glance, it seems a feasible solution to such a crisis that a level-1 AN in the UDN autonomously takes the place of the failed level-0 AN. This solution however may cause synchronization collisions in the UDN in various forms.

By way of example, FIG. 3 depicts a scenario where a direct synchronization collision occurs between level-1 ANs. As illustrated, two level-1 ANs exist in the UDN and are located in the proximity of each other (i.e., they can receive synchronization signals from each other). In case the level-0 AN is down, these two level-1 ANs autonomously act as independent new root ANs. Due to the intrinsic difference between their local synchronization references in time/frequency domain, the new root ANs themselves are not synchronous.

In another scenario shown in FIG. 4, two level-1 ANs are not located in the proximity of each other. Accordingly, in case the level-0 AN is down and the level-1 ANs autonomously act as independent new root ANs, they are unaware of the synchronization difference between each other. However, a level-2 AN, which can receive synchronization signals from both the level-1 ANs, may be confused with inconsistent synchronization signals broadcast by the two level-1 ANs. Thus, an indirect synchronization collision occurs between level-1 ANs.

SUMMARY

In view of the foregoing, an object of the present disclosure is to eliminate or alleviate at least one of the above-described synchronization collisions such that synchronization can be maintained as far as possible in a UDN employing a hierarchical synchronization scheme if the root AN is down.

According to a first aspect of the present disclosure, there is provided a method implemented in an AN at synchronization level 1 for maintaining synchronization in a radio access network employing a hierarchical synchronization mechanism. The method comprises detecting that an AN at synchronization level 0 is down and initiating a random back-off procedure. The method further comprises determining whether a first synchronization signal generated at another AN at synchronization level 1 is received during the random back-off procedure. If it is determined that no first synchronization signal is received during the random back-off procedure, a second synchronization signal providing a synchronization reference is generated and broadcast upon completion of the random back-off procedure.

According to a second aspect of the present disclosure, there is provided an AN at synchronization level 1 for maintaining synchronization in a radio access network employing a hierarchical synchronization mechanism. The AN comprises a detection section, a random back-off procedure initiation section, a determination section, a synchronization signal generation section and a synchronization signal broadcasting section. The detection section is configured to detect that an AN at synchronization level 0 is down. The random back-off procedure initiation section is configured to initiate a random back-off procedure. The determination section is configured to determine whether a first synchronization signal generated at another AN at synchronization level 1 is received during the random back-off procedure. The synchronization signal generation section is configured to generate a second synchronization signal providing a synchronization reference upon completion of the random back-off procedure, if it is determined that no first synchronization signal is received during the random back-off procedure. The synchronization signal broadcasting section is configured to broadcast the second synchronization signal.

By using the solutions according to the first and second aspects of the present disclosure, direct synchronization collisions among ANs at synchronization level 1 can be avoided to a large extent, because an AN at synchronization level 1 generates and broadcasts a synchronization signal upon completion of a random back-off procedure only if no synchronization signal is received from another AN at synchronization level 1 during the random back-off procedure.

According to a third aspect of the present disclosure, there is provided a method implemented in an AN at synchronization level n (n>1) for maintaining synchronization in a radio access network employing a hierarchical synchronization mechanism. The method comprises receiving a first synchronization signal from a first AN different from the AN at synchronization level n and starting a hysteresis timer upon receipt of the first synchronization signal. The method further comprises determining whether a second synchronization signal is received from a second AN different from the AN at synchronization level n before expiration of the hysteresis timer. If it is determined that no second synchronization signal is received before expiration of the hysteresis timer, a synchronization reference is extracted from the first synchronization signal received from the first AN after the expiration of the hysteresis timer. Then, a third synchronization signal referring to the extracted synchronization reference is generated and broadcast.

According to a fourth aspect of the present disclosure, there is provided an AN at synchronization level n (n>1) for maintaining synchronization in a radio access network employing a hierarchical synchronization mechanism. The AN comprises a reception section, a hysteresis timer starting section, a determination section, an extraction section, a synchronization signal generation section and a synchronization signal broadcasting section. The reception section is configured to receive a first synchronization signal from a first AN different from the AN at synchronization level n. The hysteresis timer starting section is configured to start a hysteresis timer upon receipt of the first synchronization signal. The determination section is configured to determine whether a second synchronization signal is received from a second AN different from the AN at synchronization level n before expiration of the hysteresis timer. The extraction section is configured to extract a synchronization reference from the first synchronization signal received from the first AN after the expiration of the hysteresis timer, if it is determined that no second synchronization signal is received before expiration of the hysteresis timer. The synchronization signal generation section is configured to generate a third synchronization signal referring to the extracted synchronization reference. The synchronization signal broadcasting section is configured to broadcast the third synchronization signal.

By using the solutions according to the third and fourth aspects of the present disclosure, indirect synchronization collisions among ANs at synchronization level 1 can be avoided to a large extent, because an AN at synchronization level 2 extracts a synchronization reference from a synchronization signal received from a first AN different from the AN at synchronization level 2 after the expiration of a hysteresis timer only if no synchronization signal is received from a second AN different from the AN at synchronization level 2 before the expiration of the timer.

According to a fifth aspect of the present disclosure, there is provided AN comprising a memory and a processor. The memory has machine-readable program code stored therein. The processor executes the stored program code to control the AN to perform the method according to the first or the third aspect of the present disclosure.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Figure 1:
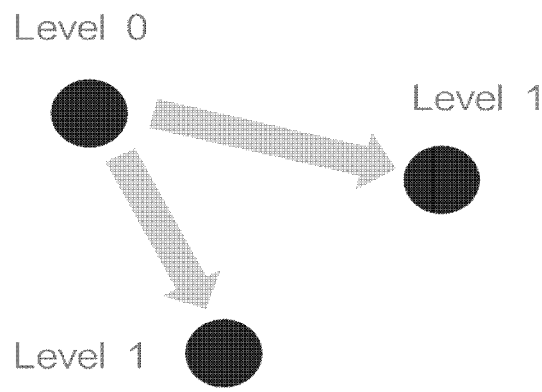
FIG. 1 is a schematic diagram illustrating how ANs in a radio access network are synchronized according to a hierarchical synchronization scheme.
Figure 2:
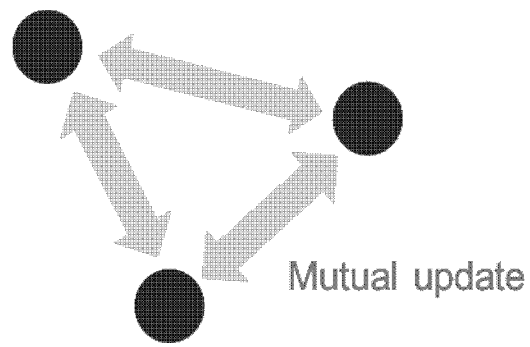
FIG. 2 is a schematic diagram illustrating how ANs in a radio access network are synchronized according to a distributed synchronization scheme.
Figure 3:
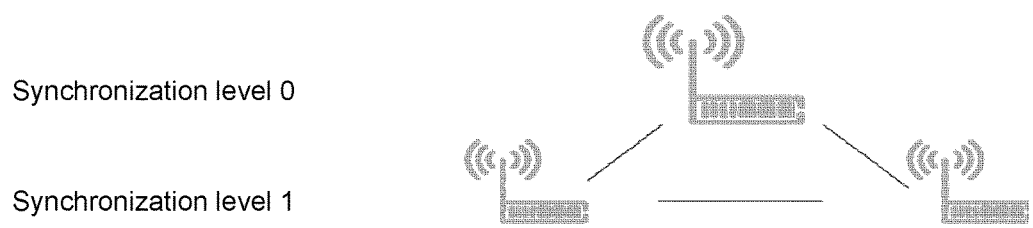
FIG. 3 is a schematic diagram illustrating a scenario where a direct synchronization collision occurs between level-1 ANs.
Figure 4:
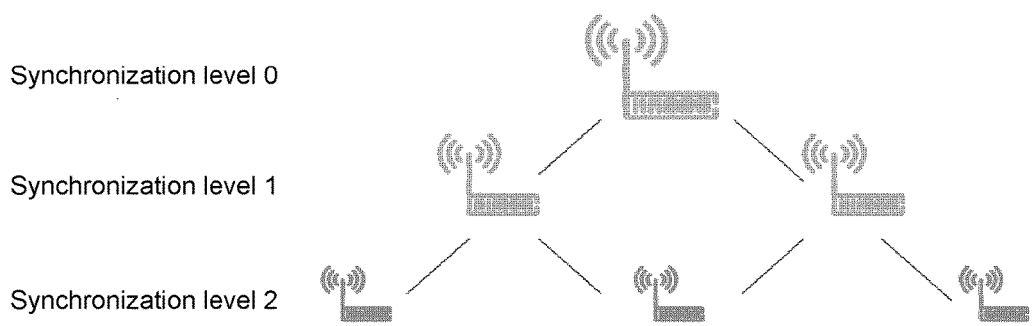
FIG. 4 is a schematic diagram illustrating a scenario where an indirect synchronization collision occurs between level-1 ANs.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that although terminology commonly used in the context of UDN is used in this disclosure to exemplify the embodiments, this should not be seen as limiting the scope of the techniques to only the aforementioned system. Other wireless systems and radio access networks to which wireless backhaul based synchronization techniques are applicable may also benefit from exploiting the ideas covered within this disclosure. Thus, the term "ANs" as used herein should be understood to refer more broadly to any kind of wireless communication stations capable of directly communicating with more than one wireless terminals.

Figure 5:
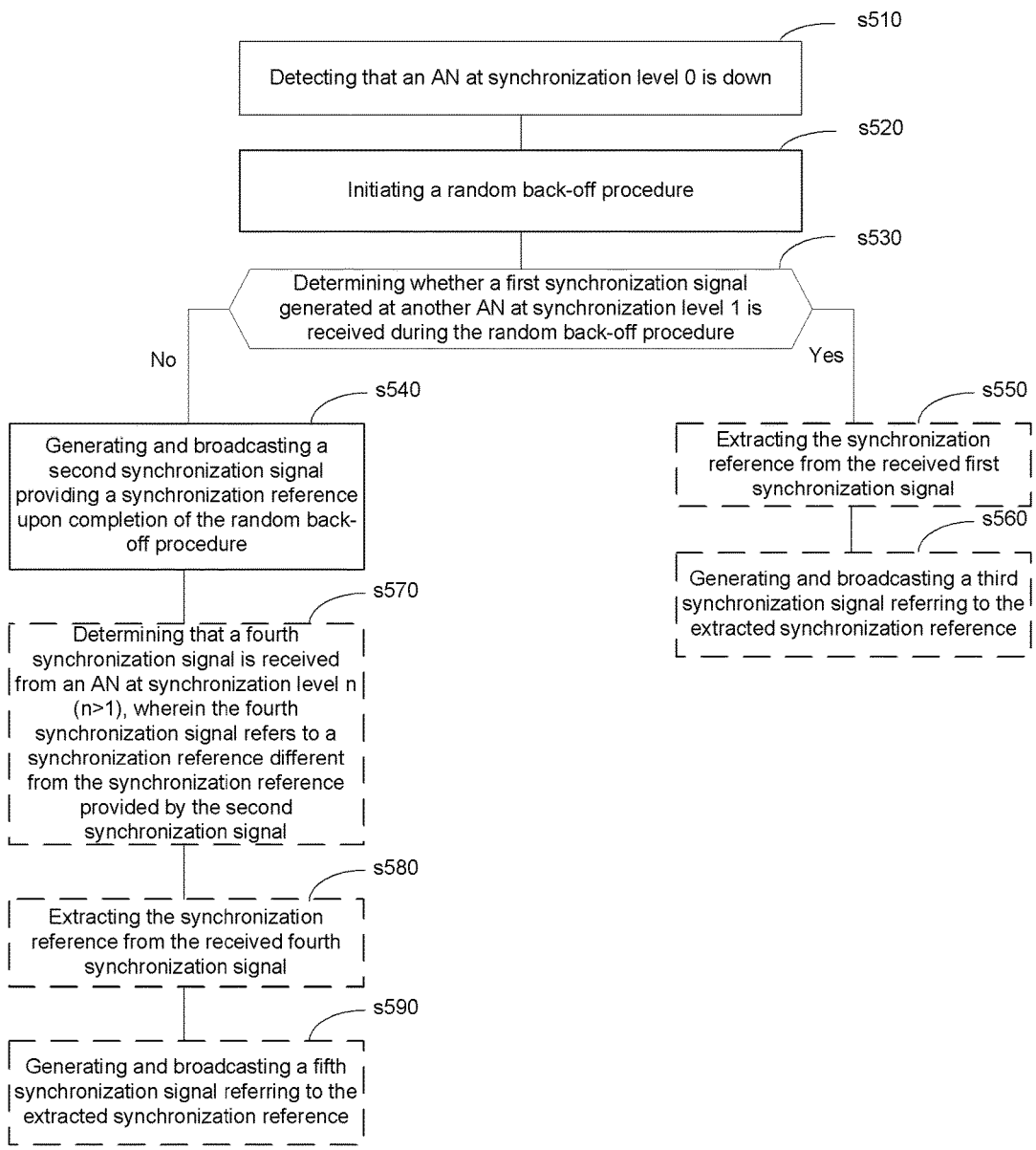
FIG. 5 is a flow chart illustrating a method implemented in an AN at synchronization level 1 for maintaining synchronization in a radio access network employing a hierarchical synchronization mechanism according to the present disclosure.

FIG. 5 schematically illustrates a method 500 implemented in an AN at synchronization level 1 for maintaining synchronization in a radio access network employing a hierarchical synchronization mechanism according to the present disclosure.

As illustrated, initially, the level-1 AN detects at step s510 that a level-0 AN is down due to some unexpected reason, such as an interruption of power supply, a hardware failure, etc. By way of example, the detection may be performed by checking whether a synchronization signal providing a synchronization reference is received from the level-0 AN during a long period.

Then, at step s520, the level-1 AN initiates a random back-off procedure, by which the level-1 AN backs off randomly to avoid collision with another level-1 AN due to the two level-1 ANs attempting to take the place of the failed level-0 AN at the same time. To achieve this, the level-1 AN may select a random value t from an interval [0, T] and start a back-off timer with a timeout period equal to the random value t. Before the expiration of the back-off timer, the level-1 AN does not take the place of the failed level-0 AN, that is, it does not act as a root AN which generates and broadcasts a synchronization signal providing a time/frequency synchronization reference (absolute or relative), to which other ANs in the radio access network refer directly or indirectly.

At step s530, the level-1 AN determines, during the random back-off procedure, whether a first synchronization signal generated at another level-1 AN is received.

If it is determined that no first synchronization signal is received during the random back-off procedure, the level-1 AN generates and broadcasts a second synchronization signal providing a synchronization reference upon completion of the random back-off procedure at step s540.

By using the above-described method, direct synchronization collisions among level-1 ANs can be avoided to a large extent, because a level-1 AN takes the place of the failed level-0 AN upon completion of a random back-off procedure only if no synchronization signal is received from another level-1 AN during the random back-off procedure.

On the other hand, if it is determined at step s530 that the first synchronization signal generated at the other level-1 AN is received during the random back-off procedure, the level-1 AN may extract the synchronization reference from the received first synchronization signal at step s550, and generate and broadcast a third synchronization signal referring to the extracted synchronization reference at step s560. As such, it can be ensured that only one of the level-1 ANs located in the proximity of each other acts as the root AN and the other level-1 ANs are synchronized to the root AN directly.

Probably, after step s540, the level-1 AN may determine that a fourth synchronization signal is received from a level-n (n>1) AN at step 570, wherein the fourth synchronization signal refers to a synchronization reference different from the synchronization reference provided by the second synchronization signal. Then, the level-1 AN may extract the synchronization reference from the received fourth synchronization signal at step s580, and generate and broadcast a fifth synchronization signal referring to the extracted synchronization reference at step s590. As such, it can be ensured that only one of the level-1 ANs located far away from each other acts as the root AN and the other level-1 ANs are synchronized to the root AN indirectly.

In the following, a first exemplary scenario will be described with respect to FIG. 6 to illustrate how level-1 ANs located in the proximity of each other operate according to the above-described method 500.

Figure 6:
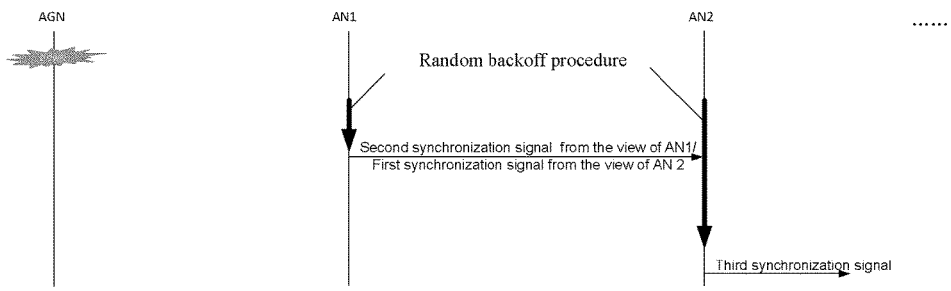
FIG. 6 is a schematic diagram illustrating an exemplary scenario where level-1 ANs located in the proximity of each other operate according to the method shown in FIG. 5.

Referring to FIG. 6, after a level-0 AN (denoted as AGN) is down, two level-1 ANs (denoted as AN1 and AN2) located in the proximity of each other detect the failure of the level-0 AN and initiate two independent random back-off procedures, by executing the above-described steps s510 and s520.

During the random back-off procedure, each of AN1 and AN2 executes the above-described step s530. As AN1 has a shorter random back-off procedure than AN2, AN1 determines that no first synchronization signal generated at another level-1 AN is received during its random back-off procedure. Accordingly, AN1 generates and broadcasts a second synchronization signal upon the completion of its random back-off procedure, by executing the above-described step s540.

On the other hand, during its random back-off procedure, AN2 by executing the above-described step s530 may determine that a first synchronization signal is received from AN1. Accordingly, it may extract the synchronization reference from the received first synchronization signal and generate and broadcast a third synchronization signal referring to the extracted synchronization reference, by executing the above-described steps s550 and s560.

Figure 7:
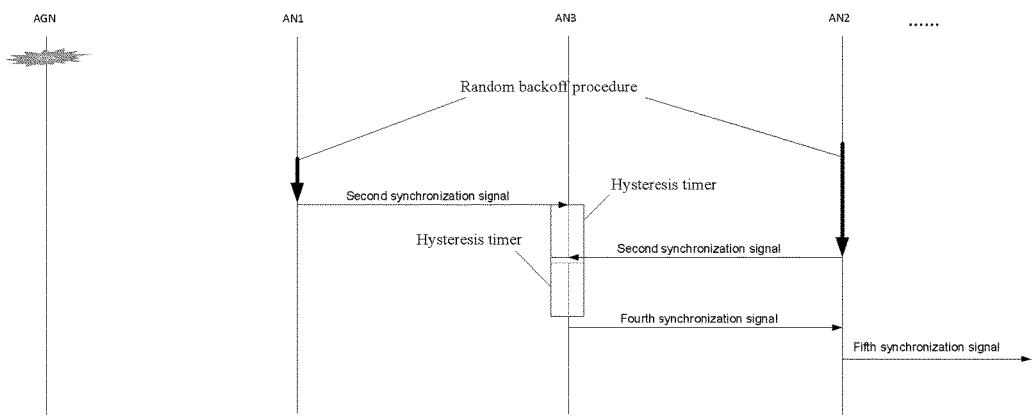
FIG. 7 is a schematic diagram illustrating an exemplary scenario where level-1 ANs located far away from each other operate according to the method shown in FIG. 5.

In FIG. 7, a second exemplary scenario is depicted to illustrate how level-1 ANs located far away from each other operate according to the above-described method 500.

As illustrated, after a level-0 AN (denoted as AGN) is down, two level-1 ANs (denoted as AN1 and AN2) located far away from each other detect the failure of the level-0 AN and initiate two independent random back-off procedures, by executing the above-described steps s510 and s520.

During the random back-off procedure, each of AN1 and AN2 executes the above-described step s530. Due to the long distance between AN1 and AN2, none of them could receive a first synchronization signal from each other. Accordingly, each of them generates and broadcasts a second synchronization signal upon the completion of its random back-off procedure, by executing the above-described step s540.

Supposing a level-2 AN (denoted as AN3) receives the two second synchronization signals broadcast by AN1 and AN2, it may choose the second synchronization signal received from AN1 and generate and broadcast a synchronization signal (denoted as fourth synchronization signal) according to the selected second synchronization signal, as will be set forth below in more detail with respect to FIG. 8.

By executing the steps s570-s590 already described with respect to FIG. 5, AN2 may determine that the fourth synchronization signal, which refers to a synchronization reference different from the synchronization reference provided by the second synchronization signal it broadcasted, is received from AN3, and generate and broadcast a fifth synchronization signal according to the received fourth synchronization signal.

In practical implementation, ANs in a radio access network may update their synchronization levels in the process of synchronization recovery to reflect their levels in a new synchronization tree formed after the original level-0 node is down. For example, in the first exemplary scenario shown in FIG. 6, AN1 may update its synchronization level to level 0, and AN2 may update its synchronization level to level 1. Likewise, in the second exemplary scenario shown in FIG. 7, AN1 may update its synchronization level to level 0, AN3 may update its synchronization level to level 1, and AN2 may update its synchronization level to level 2.

In addition to the synchronization reference, a synchronization signal generated and broadcast by an AN may carry a network ID, an AN ID, capability information and synchronization level information.

The network ID identifies a radio access network where synchronization is required. For example, the network ID may be a UDN ID used to identify a local area (such as a room, a floor, a building, etc.) or a specific enterprise network. For all ANs within a network identified with the same network ID, synchronization is mandatory.

The AN ID identifies the AN which generates and broadcasts a synchronization signal. For example, in the exemplary scenarios shown in FIGS. 6 and 7, the synchronization signals broadcast by AN1-AN3 may carry AN IDs identifying AN1-AN3, respectively. Uniqueness and signaling overhead may be considered when creating the AN ID. By way of example, a unique AN ID may be determined based on factors like date.

The capability information indicates a capability of the AN identified by the AN ID. For example, the synchronization source capability information may indicate a transmission power level of the AN, whether the AN has a wired/wireless connection to an accurate synchronization source, etc.

The synchronization level information indicates a synchronization level of the AN identified by the AN ID. For example, in the exemplary scenario shown in FIG. 6, the synchronization signal broadcast by AN1 may carry synchronization level information indicating an updated level of AN1 (i.e., level 0), and the synchronization signal broadcast by AN2 may carry synchronization level information indicating an updated level of AN2 (i.e., level 1). Likewise, in the exemplary scenario shown in FIG. 7, the synchronization signal broadcast by AN1 may carry synchronization level information indicating level 0, the synchronization signal broadcast by AN3 may carry synchronization level information indicating level 1, and the synchronization signal broadcast by AN2 may carry synchronization level information indicating level 2. Except for AN1 which acts as the root AN, AN2 and AN3 may update their synchronization levels by incrementing synchronization levels indicated by synchronization level information carried by synchronization signals they receive.

Figure 8:
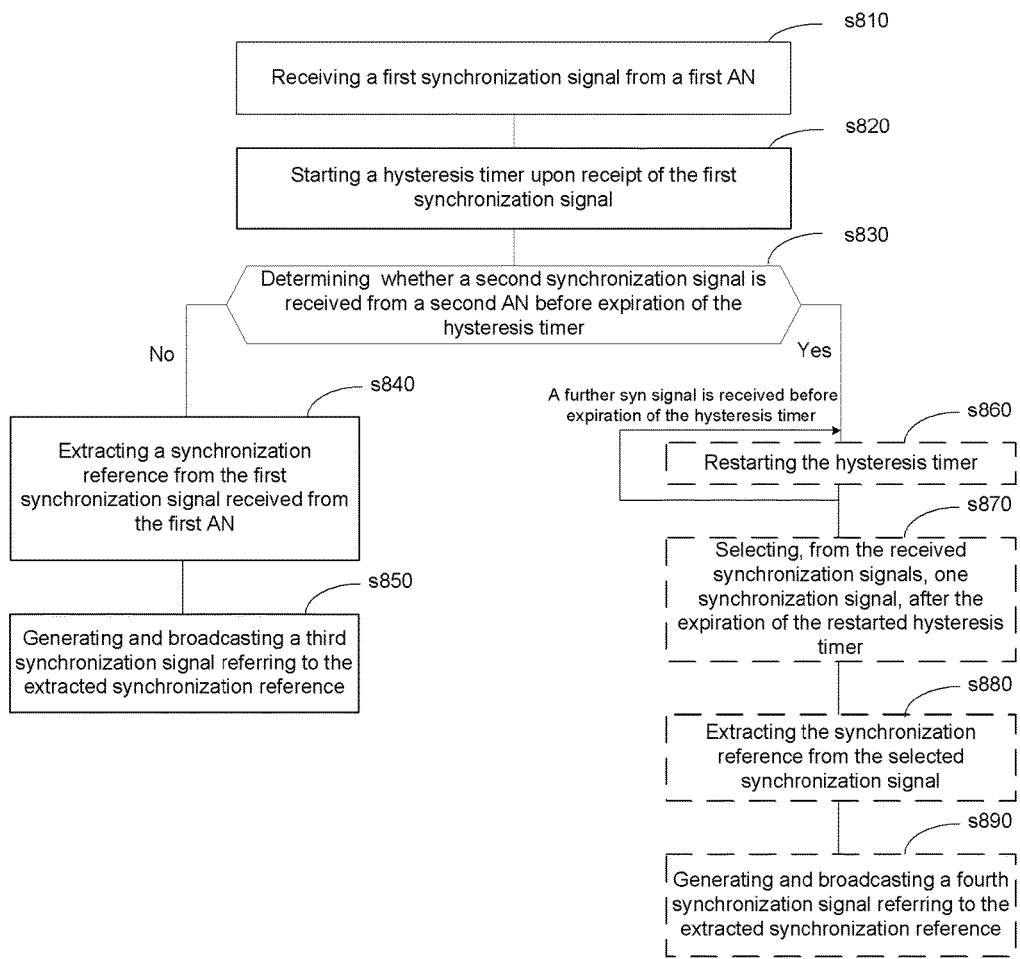
FIG. 8 is a flow chart illustrating a method implemented in an AN at synchronization level n (n>1) for maintaining synchronization in a radio access network employing a hierarchical synchronization mechanism according to the present disclosure.

FIG. 8 schematically illustrates a method 800 implemented in an AN at synchronization level n (n>1) for maintaining synchronization in case the level-0 AN is down.

As illustrated, initially, the level-n AN receives a first synchronization signal from a first AN different from the level-n AN at step s810. Instead of extracting and relaying the synchronization reference conveyed by the first synchronization signal immediately after it is received, the level-n AN starts a hysteresis timer upon receipt of the first synchronization signal at step s820.

Then, the level-n AN determines at step s830 whether a second synchronization signal is received from a second AN different from the level-n AN before expiration of the hysteresis timer.

If it is determined that no second synchronization signal is received before expiration of the hysteresis timer, the level-n AN extracts a synchronization reference from the first synchronization signal received from the first AN after the expiration of the hysteresis timer at step s840, and generate and broadcast a third synchronization signal referring to the extracted synchronization reference at step s850.

By using the above-described method, indirect synchronization collisions among level-1 ANs can be avoided to a large extent, because a level-2 AN extracts a synchronization reference from a synchronization signal received from a first AN different from the level-2 AN after the expiration of a hysteresis timer only if no synchronization signal is received from a second AN different from the level-2 AN before the expiration of the timer. Likewise, it can be ensured that an AN at a synchronization level higher than 2 relays a synchronization reference conveyed by a synchronization signal received from another AN after the expiration of a hysteresis timer only if no synchronization signal is received from a further AN before the expiration of the timer.

On the other hand, if it is determined at step s830 that the second synchronization signal is received from a second AN different from the level-n AN before expiration of the hysteresis timer or whenever a further synchronization signal is received from a further AN different from the level-n AN before expiration of the restarted hysteresis timer, the level-n AN may restart the hysteresis timer at step s860.

Then, the level-n AN may select, from the received synchronization signals, one synchronization signal after the expiration of the restarted hysteresis timer, at step s870. Here, the synchronization signal may be selected based on one or more of the above-described information carried by the received synchronization signals, as will be further detailed in the below with reference to FIG. 10.

After the synchronization signal is selected, the level-n AN may extract the synchronization reference from the selected synchronization signal at step s880, and generate and broadcast a fourth synchronization signal referring to the extracted synchronization reference at step s890.

In the following, a first exemplary scenario will be described with respect to FIG. 9 to illustrate how a level-2 AN located in the proximity of only one level-1 AN operates according to the above-described method 800.

Figure 9:
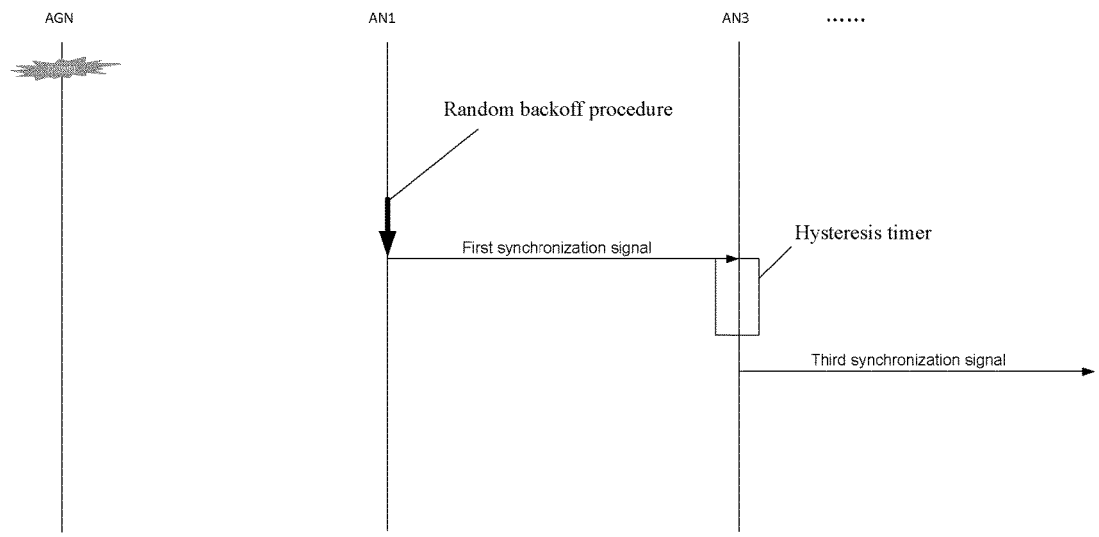
FIG. 9 is a schematic diagram illustrating an exemplary scenario where a level-2 AN located in the proximity of only one level-1 AN operates according to the method shown in FIG. 8.

Referring to FIG. 9, after a level-0 AN (denoted as AGN) is down, a level-1 AN (denoted as AN1) detects the failure of the level-0 AN and initiates a random back-off procedure. As no first synchronization signal generated at another level-1 AN is received during its random back-off procedure, AN1 generates and broadcasts a synchronization signal (denoted as first synchronization signal) upon the completion of its random back-off procedure.

A level-2 AN (denoted as AN3) located in the proximity of AN1 thus receives the first synchronization signal from AN1 and starts a hysteresis timer, by executing the above-described steps s810 and s820.

Then, by executing the above-described step s830, AN3 determines that no second synchronization signal is received from a second AN different from AN3 before expiration of the hysteresis timer. Accordingly, AN3 extracts a synchronization reference from the first synchronization signal received from the first AN after the expiration of the hysteresis timer and generates and broadcasts a third synchronization signal referring to the extracted synchronization reference, by executing the above-described steps s840 and s850.

Figure 10:
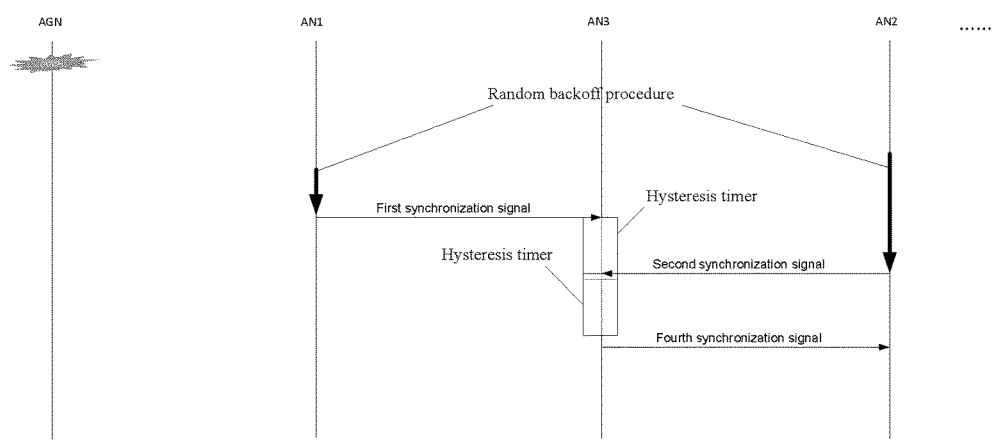
FIG. 10 is a schematic diagram illustrating an exemplary scenario where a level-2 AN located in the proximity of two level-1 ANs operates according to the method shown in FIG. 8.

In FIG. 10, a second exemplary scenario is depicted to illustrate how a level-2 AN located in the proximity of two level-1 ANs operate according to the above-described method 800.

As illustrated, after a level-0 AN (denoted as AGN) is down, two level-1 ANs (denoted as AN1 and AN2) located far away from each other detect the failure of the level-0 AN and initiate two independent random back-off procedures. As none of them receives a synchronization signal from each other, AN1 generates and broadcasts a synchronization signal (denoted as first synchronization signal) upon the completion of its random back-off procedure, while AN2 generates and broadcasts a synchronization signal (denoted as second synchronization signal) upon the completion of its random back-off procedure.

As the random back-off procedure of AN1 is short than that of AN2, a level-2 AN (denoted as AN3) located in the proximity of AN1 and AN2 may firstly receive the first synchronization signal broadcast by AN1 and start a hysteresis timer, by executing the above-described steps s810 and s820.

Then, by executing the above-described steps s830 and s860, AN3 may determine that the second synchronization signal is received from AN2 before expiration of the hysteresis timer, and restart the hysteresis timer. In practical implementation, to ensure that the second synchronization signal can be received at AN3 before the expiration of the hysteresis timer in case it is indeed transmitted from AN2, the timeout period of the hysteresis timer may be set as the upper limit of the interval [0, T] which is used by AN1 and AN2 to initiate their random back-off procedures.

As no further synchronization signal is received before the expiration of the restarted hysteresis time, AN3 may select, from the received first and second synchronization signals, one synchronization signal after the expiration of the restarted hysteresis timer by executing the above-described step s870. Here, it shall be noted that, whenever a further synchronization signal is received from a further AN different from AN3 before expiration of the restarted hysteresis timer, AN3 may restart the hysteresis timer and select one of all the received synchronization signals after the expiration of the restarted hysteresis timer, although this is not explicitly shown in FIG. 10.

As mentioned above, the selection may be based on information carried by the received synchronization signals. By way of illustration rather than limitation, AN3 may compare the AN IDs carried by the first and second synchronization signals, and select one of AN1 and AN2 which corresponds to a larger ID. Alternatively, before comparing the AN IDs, AN3 may compare the capability information carried by the first and second synchronization signals and select one of AN1 and AN2 which corresponds to a higher capability.

After the synchronization signal is selected, AN3 may extract the synchronization reference from the selected synchronization signal, and generate and broadcast a fourth synchronization signal referring to the extracted synchronization reference, by executing the above-described steps s880 and s890.

In the following, structures of an AN 1100 at synchronization level 1 and an AN 1200 at synchronization level n (n>1) for maintaining synchronization in a radio access network employing a hierarchical synchronization mechanism according to the present disclosure will be described with reference to FIGS. 11 and 12, respectively.

Figure 11:
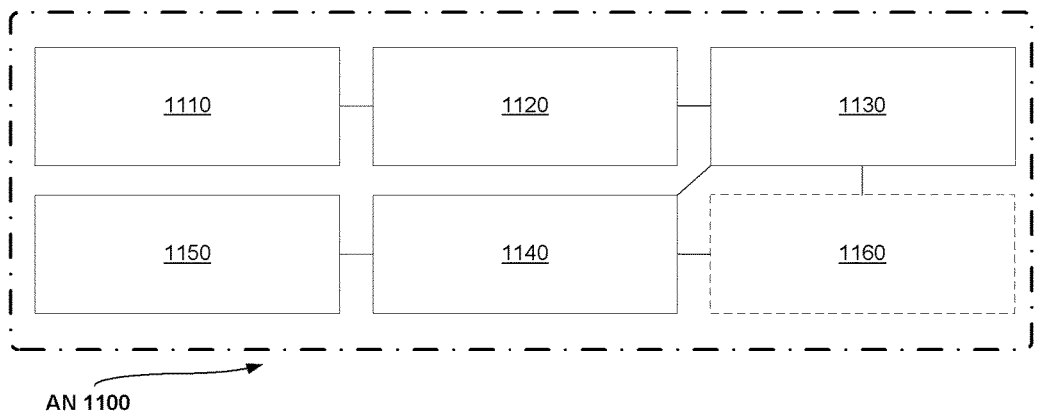
FIG. 11 is a schematic diagram illustrating a structure of an AN at synchronization level 1 according to the present disclosure.

As illustrated in FIG. 11, the AN 1100 comprises a detection section 1110, a random back-off procedure initiation section 1120, a determination section 1130, a synchronization signal generation section 1140 and a synchronization signal broadcasting section 1150. The detection section 1110 is configured to detect that an AN at synchronization level 0 is down. The random back-off procedure initiation section 1120 is configured to initiate a random back-off procedure. The determination section 1130 is configured to determine whether a first synchronization signal generated at another AN at synchronization level 1 is received during the random back-off procedure. The synchronization signal generation section 1140 is configured to generate a second synchronization signal providing a synchronization reference upon completion of the random back-off procedure, if it is determined that no first synchronization signal is received during the random back-off procedure. The synchronization signal broadcasting section 1150 is configured to broadcast the second synchronization signal.

In an embodiment, the AN 1100 may further comprise a synchronization reference extraction section 1160. The synchronization reference extraction section 1160 may be configured to extract the synchronization reference from the received first synchronization signal, if it is determined that the first synchronization signal generated at the other AN at synchronization level 1 is received during the random back-off procedure. The synchronization signal generation section 1140 may be further configured to generate a third synchronization signal referring to the extracted synchronization reference. The broadcasting section 1150 may be further configured to broadcast the third synchronization signal.

In an embodiment, the determination section 1130 may be further configured to, after the second synchronization signal providing the synchronization reference is generated and broadcast, determine that a fourth synchronization signal is received from an AN at synchronization level n (n>1), wherein the fourth synchronization signal refers to a synchronization reference different from the synchronization reference provided by the second synchronization signal. The synchronization reference extraction section 1160 may be configured to extract the synchronization reference from the received fourth synchronization signal. The synchronization signal generation section 1140 may be configured to generate a fifth synchronization signal referring to the extracted synchronization reference. The synchronization signal broadcasting section 1150 may be configured to broadcast the fifth synchronization signal.

In an embodiment, the AN 1100 may further comprise a synchronization level updating section configured to update a synchronization level of the AN at synchronization level 1.

As those skilled in the art will appreciate, the above-described detection section, random back-off procedure initiation section, determination section, synchronization signal generation section, synchronization signal broadcasting section, synchronization reference extraction section and synchronization level updating section may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the AN 1100 may comprise a memory, a processor (including but not limited to a microprocessor, a microcontroller or a Digital Signal Processor (DSP), etc.) and a transceiver. The memory stores machine-readable program code executable by the processor. The processor, when executing the machine-readable program code, performs the functions of the detection section, the random back-off procedure initiation section, the determination section, the synchronization signal generation section, the synchronization reference extraction section and the synchronization level updating section. The transceiver broadcasts any synchronization signal generated by the processor.

Figure 12:
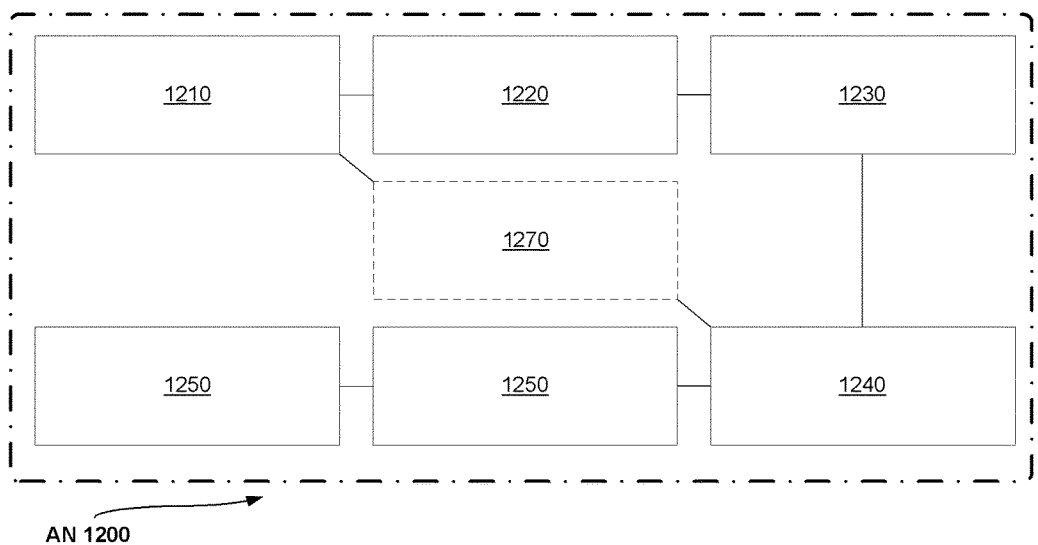
FIG. 12 is a schematic diagram illustrating a structure of an AN at synchronization level n (n>1) according to the present disclosure.

As illustrated in FIG. 12, the AN 1200 comprises a reception section 1210, a hysteresis timer starting section 1220, a determination section 1230, an extraction section 1240, a synchronization signal generation section 1250 and a synchronization signal broadcasting section 1260. The reception section 1210 is configured to receive a first synchronization signal from a first AN different from the AN at synchronization level n. The hysteresis timer starting section 1220 is configured to start a hysteresis timer upon receipt of the first synchronization signal. The determination section 1230 is configured to determine whether a second synchronization signal is received from a second AN different from the AN at synchronization level n before expiration of the hysteresis timer. The extraction section 1240 is configured to extract a synchronization reference from the first synchronization signal received from the first AN after the expiration of the hysteresis timer, if it is determined that no second synchronization signal is received before expiration of the hysteresis timer. The synchronization signal generation section 1250 is configured to generate a third synchronization signal referring to the extracted synchronization reference. The synchronization signal broadcasting section 1260 is configured to broadcast the third synchronization signal.

In an embodiment, the hysteresis timer starting section 1220 may be further configured to restart the hysteresis timer, if it is determined that the second synchronization signal is received from the second AN before expiration of the hysteresis timer or whenever a further synchronization signal is received from a further AN different from the AN at synchronization level n before expiration of the restarted hysteresis timer. The reception section 1210 may be further configured to receive the second synchronization signal from the second AN before the expiration of the hysteresis timer or to receive the further synchronization signal from the further AN before the expiration of the restarted hysteresis timer. The AN 1200 may further comprise a selection section 1270 configured to select, from the received synchronization signals, one synchronization signal after the expiration of the restarted hysteresis timer. The extraction section 1240 may be further configured to extract the synchronization reference from the selected synchronization signal. The synchronization signal generation section 1250 may be further configured to generate a fourth synchronization signal referring to the extracted synchronization reference. The synchronization signal broadcasting section 1260 may be further configured to broadcast the fourth synchronization signal.

In an embodiment, the synchronization signal may be selected from the received synchronization signals, based on information carried by the received synchronization signals.

In an embodiment, the AN 1200 may further comprise a synchronization level updating section configured to update a synchronization level of the AN at synchronization level n (n>1).

As those skilled in the art will appreciate, the above-described reception section, hysteresis timer starting section, determination section, extraction section, synchronization signal generation section, synchronization signal broadcasting section, selection section and synchronization level updating section may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the AN 1200 may comprise a transceiver, a memory and a processor (including but not limited to a microprocessor, a microcontroller or a Digital Signal Processor (DSP), etc.) The transceiver receives any synchronization signal from an AN at synchronization level n–1. The memory stores machine-readable program code executable by the processor. The processor, when executing the machine-readable program code, performs the functions of the hysteresis timer starting section, the determination section, the extraction section, the synchronization signal generation section, the selection section and the synchronization level updating section. The transceiver further broadcasts any synchronization signal generated by the processor.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

REFERENCES

[1] 3GPP TR 36.922 V11.0.0, 2012-09.
[2] O. Simeone, U. Spagnolini, Y. Bar-Ness, S. H. Strogatz, "Distributed Synchronization in Wireless Networks", IEEE SIGNAL PROCESSING MAGAZINE, pp. 81-97, September 2008.
[3] 3GPP TR 36.843 V12.0.1, 2014-03.

What is claimed is:

1. A method implemented in an Access Node (AN) at synchronization level 1 for maintaining synchronization in a radio access network employing a hierarchical synchronization mechanism, comprising:
    detecting that an AN at synchronization level 0 is down, wherein the synchronization level 0 provides a root synchronization reference that is propagated within the hierarchical synchronization mechanism for use in synchronizing other levels of the hierarchical synchronization mechanism;
    initiating a random back-off procedure;
    determining whether a first synchronization signal generated at another AN at synchronization level 1 is received during the random back-off procedure; and
    generating and broadcasting a second synchronization signal providing a synchronization reference upon completion of the random back-off procedure, if it is determined that no first synchronization signal is received during the random back-off procedure.

2. The method of claim 1, further comprising: if it is determined that the first synchronization signal generated at the other AN at synchronization level 1 is received during the random back-off procedure,
    extracting the synchronization reference from the received first synchronization signal; and
    generating and broadcasting a third synchronization signal referring to the extracted synchronization reference.

3. The method of claim 1, further comprising: after generating and broadcasting the second synchronization signal providing the synchronization reference,
    determining that a fourth synchronization signal is received from an AN at synchronization level n, where n>1, wherein the fourth synchronization signal refers to a synchronization reference different from the synchronization reference provided by the second synchronization signal;
    extracting the synchronization reference from the received fourth synchronization signal; and
    generating and broadcasting a fifth synchronization signal referring to the extracted synchronization reference.

4. The method of claim 1, further comprising:
    updating a synchronization level of the AN at synchronization level 1.

5. The method of claim 1, wherein
    each of the synchronization signals carries a network ID identifying the radio access network and an AN ID identifying the AN which broadcasts said each of the synchronization signals.

6. The method of claim 5, wherein
    each of the synchronization signals further carries capability information indicating a capability of the AN identified by the AN ID and synchronization level information indicating a synchronization level of the AN identified by the AN ID.

7. A method implemented in an Access Node (AN) at synchronization level n, where n>1, for maintaining synchronization in a radio access network employing a hierarchical synchronization mechanism, comprising:
    receiving a first synchronization signal from a first AN different from the AN at synchronization level n;
    starting a hysteresis timer upon receipt of the first synchronization signal;
    determining whether a second synchronization signal is received from a second AN different from the AN at synchronization level n before expiration of the hysteresis timer;
    extracting a synchronization reference from the first synchronization signal received from the first AN after the expiration of the hysteresis timer, if it is determined that no second synchronization signal is received before expiration of the hysteresis timer; and
    generating and broadcasting a third synchronization signal referring to the extracted synchronization reference.

8. The method of claim 7, further comprising:
    restarting the hysteresis timer, if it is determined that the second synchronization signal is received from the second AN before expiration of the hysteresis timer or whenever a further synchronization signal is received from a further AN different from the AN at synchronization level n before expiration of the restarted hysteresis timer;

selecting, from the received synchronization signals, one synchronization signal after the expiration of the restarted hysteresis timer;
extracting the synchronization reference from the selected synchronization signal; and
generating and broadcasting a fourth synchronization signal referring to the extracted synchronization reference.

9. The method of claim 8, wherein
the synchronization signal is selected from the received synchronization signals, based on information carried by the received synchronization signals.

10. The method of claim 9, wherein the information includes at least one of the following:
an AN ID identifying the AN by which each of the received synchronization signals is broadcast; and
capability information indicating a capability of the AN identified by the AN ID.

11. The method of claim 7, further comprising:
updating a synchronization level of the AN at synchronization level n, where n>1.

12. An Access Node (AN) at synchronization level 1 for maintaining synchronization in a radio access network employing a hierarchical synchronization mechanism, comprising:
a transceiver; and
a processor and a non-transitory computer readable storage medium, the non-transitory computer readable storage medium containing program code, which when executed by the processor, causes the AN to:
detect that an AN at synchronization level 0 is down, wherein the synchronization level 0 provides a root synchronization reference that is propagated within the hierarchical synchronization mechanism for use in synchronizing other levels of the hierarchical synchronization mechanism;
initiate a random back-off procedure;
determine whether a first synchronization signal generated at another AN at synchronization level 1 is received during the random back-off procedure; and
generate a second synchronization signal providing a synchronization reference upon completion of the random back-off procedure, if it is determined that no first synchronization signal is received during the random back-off procedure; and
wherein the transceiver is configured to broadcast the second synchronization signal.

13. The AN of claim 12, wherein the program code, which when executed by the processor, further causes the AN to:
if it is determined that the first synchronization signal generated at the other AN at synchronization level 1 is received during the random back-off procedure, extract the synchronization reference from the received first synchronization signal, and
generate a third synchronization signal referring to the extracted synchronization reference, and
wherein the transceiver is further configured to broadcast the third synchronization signal.

14. The AN of claim 12, wherein the program code, which when executed by the processor, further causes the AN to:
after the second synchronization signal providing the synchronization reference is generated and broadcast, determine that a fourth synchronization signal is received from an AN at synchronization level n, where n>1, wherein the fourth synchronization signal refers to a synchronization reference different from the synchronization reference provided by the second synchronization signal;
extract the synchronization reference from the received fourth synchronization signal; and
generate a fifth synchronization signal referring to the extracted synchronization reference; and
wherein the transceiver is configured to broadcast the fifth synchronization signal.

15. The AN of claim 12, wherein the program code, which when executed by the processor, further causes the AN to update a synchronization level of the AN at synchronization level 1.

16. The AN of claim 12, wherein
each of the synchronization signals carries a network ID identifying the radio access network and an AN ID identifying the AN which broadcasts said each of the synchronization signals.

17. The AN of claim 16, wherein
each of the synchronization signals further carries synchronization source capability information indicating a capability of the AN identified by the AN ID and synchronization level information indicating a synchronization level of the AN identified by the AN ID.

18. An access node (AN) at synchronization level n, where n>1, for maintaining synchronization in a radio access network employing a hierarchical synchronization mechanism, comprising:
a transceiver configured to receive a first synchronization signal from a first AN different from the AN at synchronization level n; and
a processor and a non-transitory computer readable storage medium, the non-transitory computer readable storage medium containing program code, which when executed by the processor, causes the AN to:
start a hysteresis timer upon receipt of the first synchronization signal;
determine whether a second synchronization signal is received from a second AN different from the AN at synchronization level n before expiration of the hysteresis timer;
extract a synchronization reference from the first synchronization signal received from the first AN after the expiration of the hysteresis timer, if it is determined that no second synchronization signal is received before expiration of the hysteresis timer;
generate a third synchronization signal referring to the extracted synchronization reference; and
wherein the transceiver is configured to broadcast the third synchronization signal.

19. The AN of claim 18, wherein the program code, which when executed by the processor, further causes the AN to:
restart the hysteresis timer, if it is determined that the second synchronization signal is received from the second AN before expiration of the hysteresis timer or whenever a further synchronization signal is received from a further AN different from the AN at synchronization level n before expiration of the restarted hysteresis timer, in which the transceiver is further configured to receive the second synchronization signal from the second AN before the expiration of the hysteresis timer or to receive the further synchronization signal from the further AN before the expiration of the restarted hysteresis timer;
select, from the received synchronization signals, one synchronization signal after the expiration of the restarted hysteresis timer;

extract the synchronization reference from the selected synchronization signal; and
generate a fourth synchronization signal referring to the extracted synchronization reference; and
wherein the transceiver is further configured to broadcast the fourth synchronization signal.

20. The AN of claim 19, wherein
the synchronization signal is selected from the received synchronization signals, based on information carried by the received synchronization signals.

* * * * *